United States Patent
Yamada

(12) 
(10) Patent No.: US 6,512,998 B1
(45) Date of Patent: Jan. 28, 2003

(54) SPUTTER PROFILE SIMULATION METHOD

(75) Inventor: Hiroaki Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,719

(22) Filed: Mar. 18, 1999

(30) Foreign Application Priority Data

Mar. 26, 1998 (JP) .......................................... 10-080018

(51) Int. Cl.⁷ .............................................. G06G 7/48
(52) U.S. Cl. ............................ 703/6; 703/13; 703/14; 703/7
(58) Field of Search ............................... 703/14, 6, 13; 204/298.01, 298.03, 192.13; 118/715

(56) References Cited

U.S. PATENT DOCUMENTS 5,751,607 A * 5/1998 Ohta ............................ 703/13
5,983,011 A * 11/1999 Yamada ....................... 703/14

FOREIGN PATENT DOCUMENTS

| JP | 652269 | 2/1994 | ............ G06F/15/60 |
| JP | 8171549 | 7/1996 | ............ G06F/17/00 |
| JP | 8274084 | 10/1996 | ............ H01L/21/31 |
| JP | 10-212577 | 8/1998 | ............ C23C/14/34 |
| JP | 10212577 | 8/1998 | ............ C23C/14/34 |
| JP | 10-294293 | 11/1998 | ............ H01L/21/285 |
| JP | 10-306371 | 11/1998 | ............ C23C/14/34 |

OTHER PUBLICATIONS

Yamada et al., "A practical Sputter Equipment Simulation System For Aluminum Including Surface Diffusion model", IEEE 1996 International Conference on Simulation of Semiconductor Processes and devices, Sep. 1996.*

Yamada et al., "Practical Monte Carlo Sputter deposition Simulation with Quasi–Axis_Symmetrical (QAS) Approximation", IEEE Electron Device Meeting, Dec. 1994.*

"A Practical Sputter Equipment Simulation System for Aluminum Including Surface Diffusion Model" Yamada et al SISPAD96 Technical Digest; pp. 77–78.

* cited by examiner

*Primary Examiner*—Samuel Broda
*Assistant Examiner*—K. Thangavelu
(74) *Attorney, Agent, or Firm*—Hayes Soloway PC

(57) ABSTRACT

The present invention provides a sputter profile simulation method which reduces a calculation time. The method comprises the steps of calculating sputter trajectories of particles emitted from a sputter target; projecting the sputter trajectories onto one or more first planes; extracting an outline of a contact hole on a second plane parallel to one of the first planes; defining two shadow points preventing the particles from going to a film-growth calculation coordinates point; and judging that, out of the sputter particle trajectories projected on the first plane, the sputter trajectories between two lines as film-growth contributing trajectories, the two lines joining the film-growth calculation coordinates point to each of the two shadow points.

11 Claims, 5 Drawing Sheets

SPUTTER PROFILE SIMULATION METHOD

BACKGROUND OF THE INVENTION

The present invention relates to a sputter profile simulation method for simulating the profile of a film formed on a semiconductor substrate during the sputtering process of the semiconductor device manufacturing process.

An example of a conventional sputtering profile simulation method is disclosed in Japanese Patent Publication (unexamined) No. A-10-015101 and is described in "A Practical Sputter Equipment Simulation System for Aluminum Including Surface Diffusion Model" by H. Yamada, pages 77–78 in "SISPAD96 Technical Digest" issued from Japan Applied Physics Society.

This simulation method comprises means for directing a flux to the profile, means for judging whether or not the flux is shadowed, and means for moving the profile point when the flux is not shadowed.

The conventional sputter profile simulation system with this configuration operates as follows. That is, the following quasi-three-dimensional shadow judgment is made from the sputter particle trajectory to calculate the film growth. First, ① create string data connecting the coordinates of the outline obtained as the cross section of the contact hole along the center line to generate a model of the contact hole profile, ② select one of the coordinates forming the profile at which film growth is to be calculated and direct the sputter particle trajectory calculated by the Monte Carlo method toward that point, ③ select one of profile points for shadow judgment and calculate the distance between this point and the contact hole symmetrical axis, ④ calculate the intersection of the horizontal plane containing profile points for shadow judgment and the trajectory and, if the distance between the intersection and the contact hole symmetrical axis is larger than the distance between the profile point for shadow judgment and the contact hole symmetrical axis, determine that the particles will not be supplied through shadow effects, ⑤ move the coordinates for film growth calculation into the direction of trajectory if no shadow effect is generated, ⑥ make a shadow judgment for all profile points according to steps to ③ to ⑤, ⑦ calculate film growth at all profile points according to step ② to ⑥.

The problem with this conventional technique is that the shadow judgment to determine whether or not sputter particles will contribute to film growth takes long calculation time. This is because the shadow judgment is made for all sputter particles including those which will not contribute to the growth of a film of sputter particles. In addition to the patent publication described above, earlier patent disclosures dealing with profile simulation are found in Japanese Patent Publication (unexamined) No. A-6-52269, Japanese Patent Publication (unexamined) No. A-8-171549, and Japanese Patent Publication (unexamined) No. A-8-274084. Japanese Patent Publication (unexamined) No. A-6-52269 discloses a three-dimensional shadowing effect calculation method in which a mesh is defined for the surface of an object and a set of hidden mesh points are identified from the profile of the neighboring areas. Japanese Patent Publication (unexamined) No. A-8-171549 and Japanese Patent Publication (unexamined) No. A-8-274084, applied by the same applicant, disclose a prior art of profile simulation. These known techniques also take long calculation time in simulation.

SUMMARY OF THE INVENTION

In view of the foregoing, it is an object of the present invention to provide a sputter profile simulation method which reduces the calculation time. The method is a computerized simulation method comprising the steps of calculating sputter trajectories of particles emitted from a sputter target; projecting the sputter trajectories onto one or more first planes; extracting an outline of a contact hole on a second plane parallel to one of the first planes; defining two shadow points preventing the particles from going to a film-growth calculation coordinates point; and judging that, out of the sputter particle trajectories projected on the first plane, the sputter trajectories between two lines as film-growth contributing trajectories, the two lines joining the film-growth calculation coordinates point to each of the two shadow points.

Sputter trajectory calculation is made, for example, by the Monte Carlo method. The sputter trajectories may be projected on one plane only. For higher efficiency, a plane parallel to the cross section of the contact hole is usually used. In the embodiments, two planes, the XZ plane and YZ plane in the XYZ coordinate system, are used. The shadow point should be a point such that the line starting at the film growth coordinates inside the contact hole is tangent to the innermost point of the contact hole outline. Note that there is no need for three-dimensional film growth processing for all sputter trajectories. Those sputter trajectories not contributing to film growth are eliminated beforehand. That is, based on the relation between the sputter trajectory projection onto the plane and the contact hole outline on a plane parallel to the projection plane, the sputter trajectories which generate shadows and do not reach the film growth coordinates inside the contact hole are eliminated. After that, a three-dimensional judgment is made according to the required precision to calculate the film growth. Thus, instead of calculating the film growth for all sputter trajectories, this method performs simulation more quickly.

DETAILED DESCRIPTION OF THE PREFERRED EMBODIMENT

Figure 1:
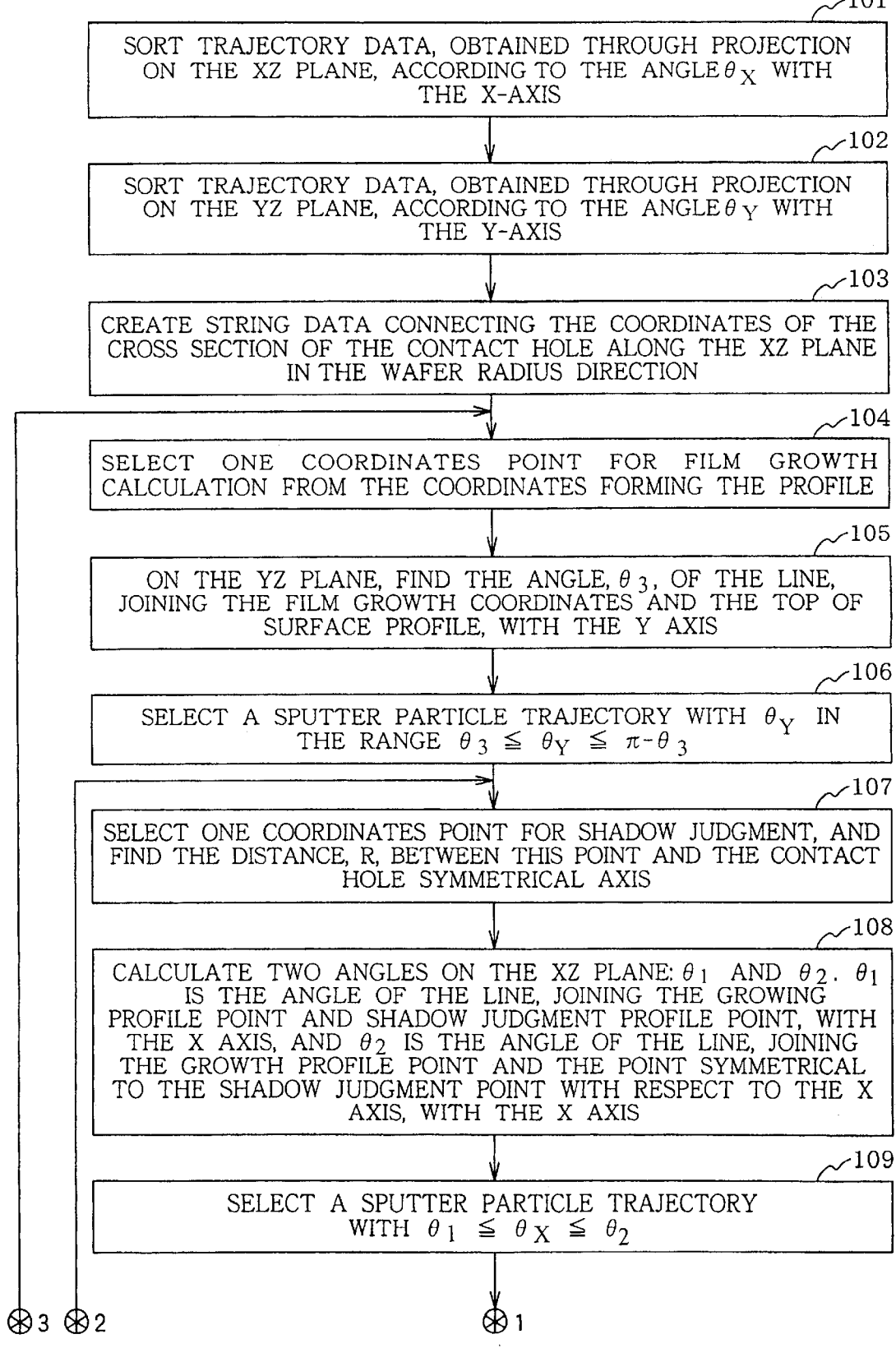
FIG. 1 is the first half of a flowchart showing the first embodiment of the present invention.
Figure 2:
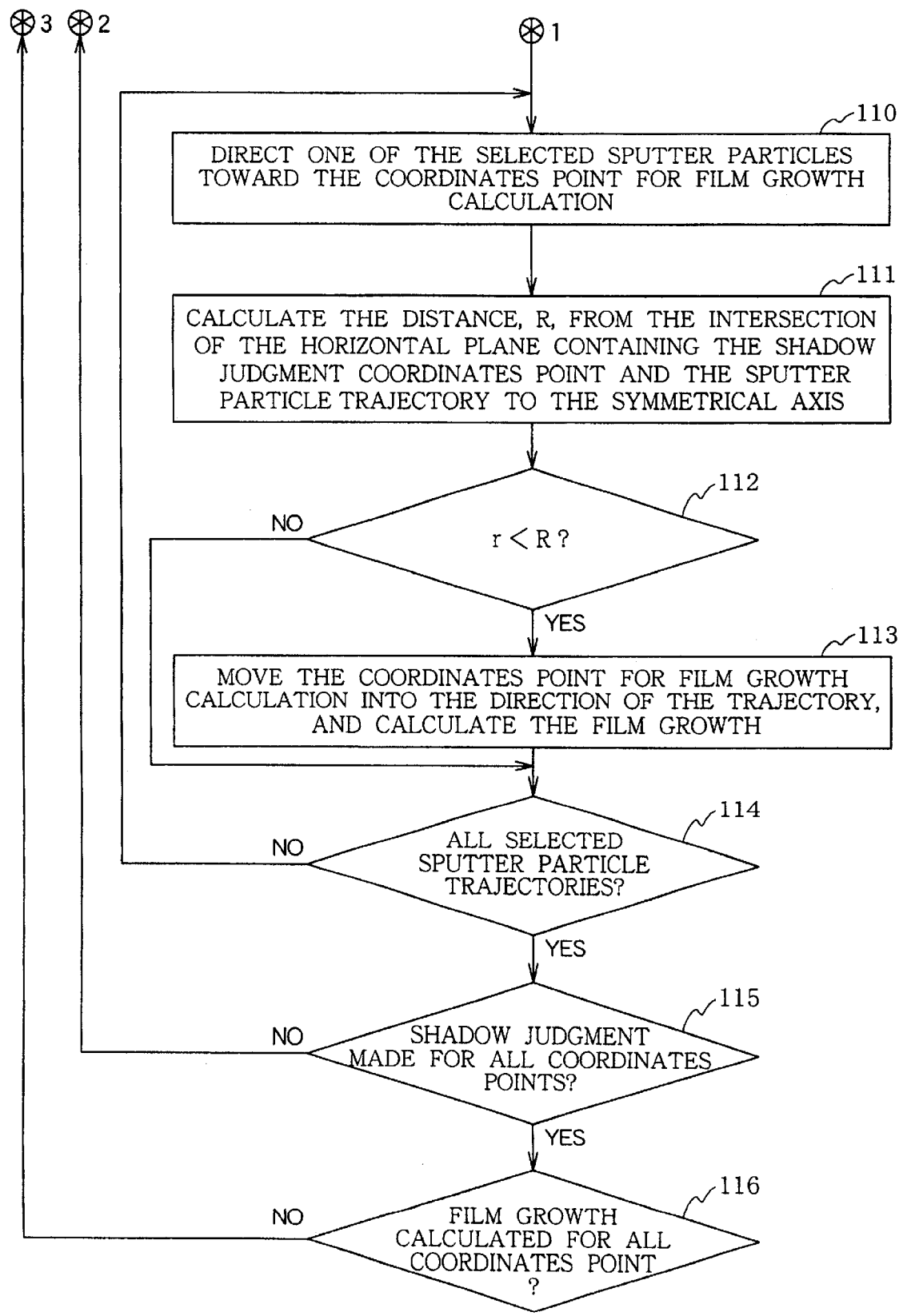
FIG. 2 is the second half of a flowchart showing the first embodiment of the present invention.
Figure 3:
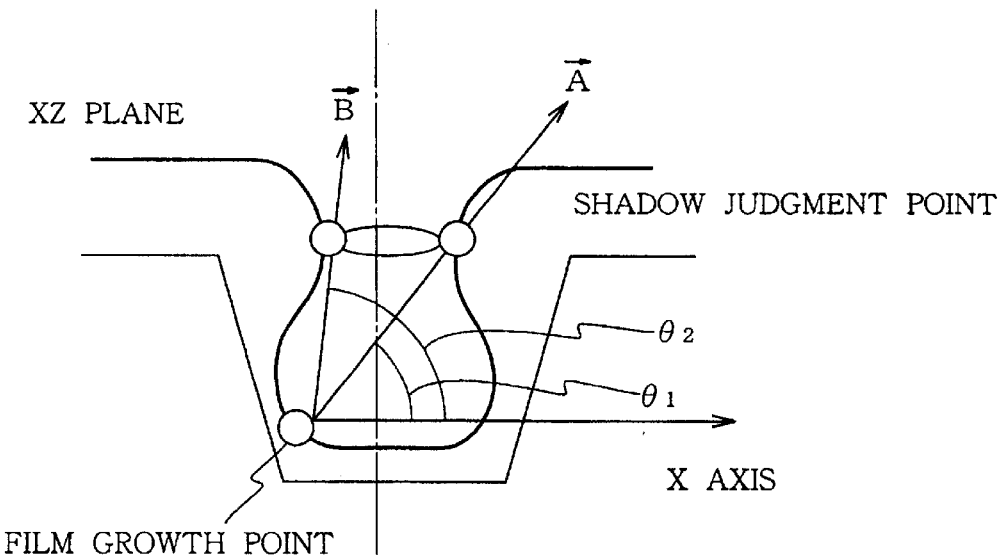
FIG. 3 is a two-dimensional cross section of a via hole.
Figure 4:
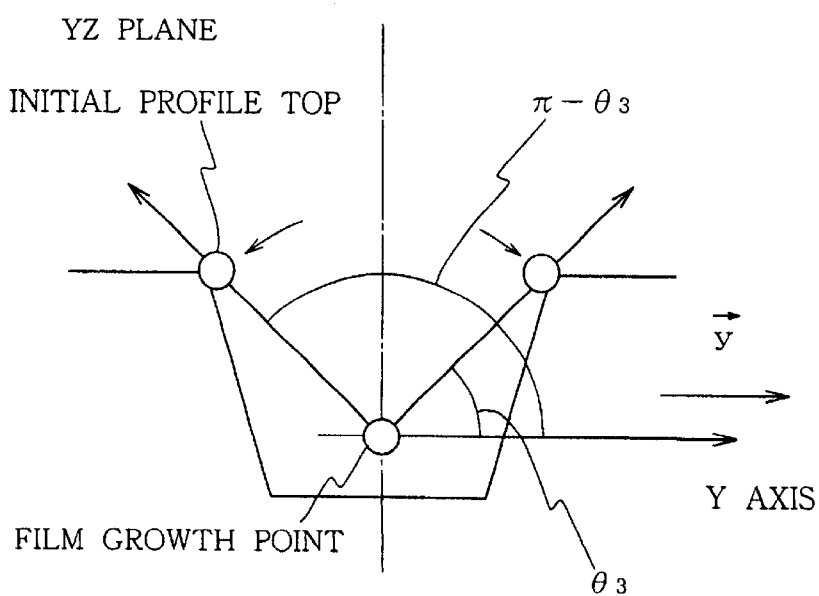
FIG. 4 is a two-dimensional cross section of a via hole.
Figure 5:
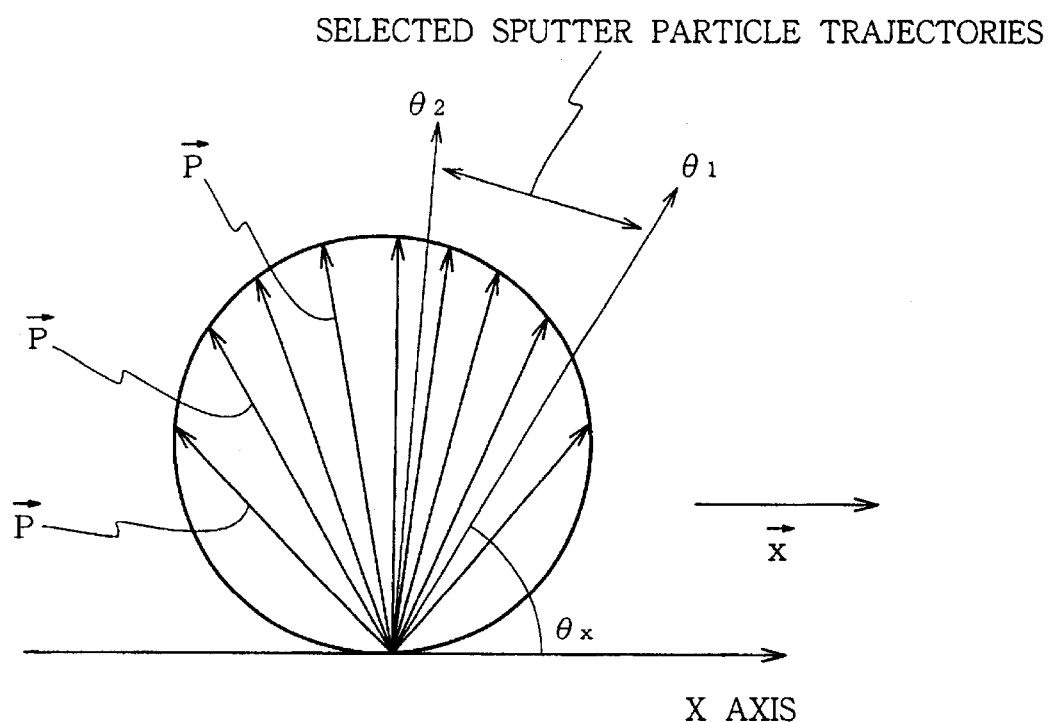
FIG. 5 is a schematic diagram of projection data of sputter particle trajectory onto a two-dimensional plane.
Figure 6:
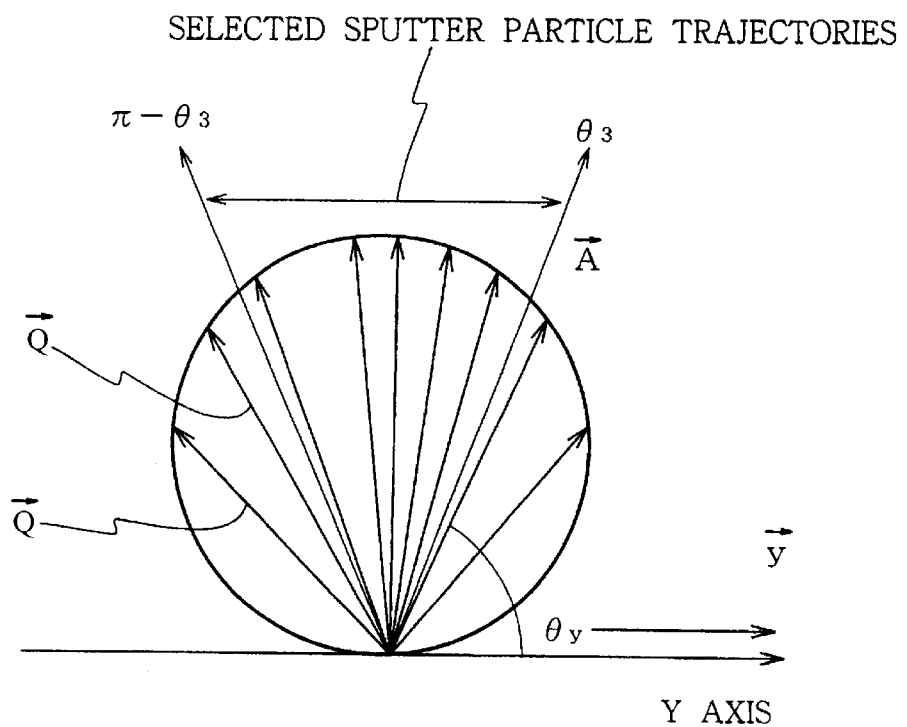
FIG. 6 is a schematic diagram of projection data of sputter particle trajectory onto a two-dimensional plane.
Figure 7:
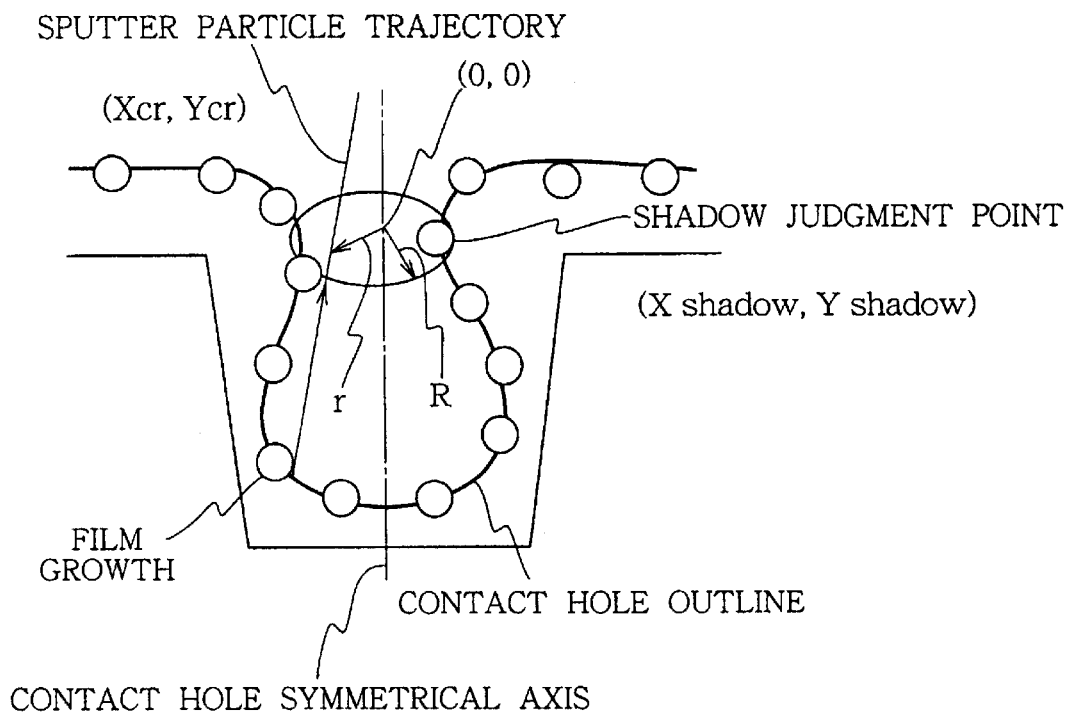
FIG. 7 is a schematic diagram of quasi-three-dimensional shadow judgment.

Some embodiments according to the present invention will be described more in detail with reference to the attached drawings. FIGS. 1 and 2 are flowcharts showing the operation of a first embodiment. FIGS. 3 and 4 are two-dimensional cross sections of a via-hole on the XZ and YZ planes. FIGS. 5 and 6 are schematic diagrams of projection data of sputter particle trajectories, calculated through the Monte Carlo method, onto the XZ plane and the YZ plane, respectively. FIG. 7 is a schematic diagram of a quasi-three-dimensional shadow judgment.

First, sputter particle trajectories calculated through the Monte Carlo method are projected onto the XZ plane, and the trajectory data is sorted in ascending order of the angle $\theta_x$ with respect to the X-axis (step 101). That is, the trajectory data projected on the XZ plane is sorted according to the angle $\theta_x$ with respect to the X-axis. Let P be the vector of each three-dimensional sputter particle trajectory projected on the XZ plane. According to the definition of an angle between vectors, the angle $\theta_x$ between the projected vector and the unit vector x in the X-axis direction is calculated using formula 1 given below.

$$\theta x = \cos^{-1}\left(\frac{\vec{P}\cdot\vec{x}}{|\vec{P}|\cdot|\vec{x}|}\right) \qquad \text{Formula 1}$$

After calculating the $\theta_x$ for all trajectories, the vectors (sputter particle trajectories) are sorted in ascending order of $\theta_x$. The vectors are numbered in ascending order and stored in an array. More specifically, the vectors are sorted, for example, according to the procedure described below. One piece of sputter particle data is selected at random, its angle $\theta_x$ is stored in the data array, and 1 is assigned to N and M, respectively. Let this data be the first processed data, and for all the other sputter particle data, N is sequentially numbered such that the last data's N has the total number of the data. Then, the next sputter particle is randomly selected from the rest of the data processed and its trajectory angle $\theta_x$ is compared with $\theta_x$ of the Nth data. If the next sputter particle trajectory angle $\theta_x$ is larger, the total number of data pieces with $\theta_x$ larger than that of N is assigned to M. When M is even, formula 2 given below is applied; when M is odd, formula 4 given below is applied. On the other hand, if the sputter particle trajectory angle $\theta_x$ is smaller than $\theta_x$ of the Nth trajectory angle data, the total number of data pieces with $\theta_x$ smaller than that of N is assigned to M. When M is even, formula 3 given below is applied; when M is odd, formula 5 given below is applied.

$N=N+\frac{1}{2}\times M$ \qquad Formula 2

$N=N-\frac{1}{2}\times M$ \qquad Formula 3

$N=N+\frac{1}{2}\times(M-1)$ \qquad Formula 4

$N=N-\frac{1}{2}\times(M-1)$ \qquad Formula 5

This is repeated until M reaches 1. The next sputter particle data is stored between N and N+1 when its $\theta_x$ value is larger than the $\theta_x$ value of the Nth data. The next sputter particle data is stored immediately before N when its $\theta_x$ value is smaller than the $\theta_x$ value of the Nth data. And the numbers are rearranged so as to be sequential beginning from 1.

Executing the above procedure puts all sputter particle trajectory data into the data array in ascending order of $\theta_x$.

Next, sputter particle trajectories are projected onto the YZ plane, and the trajectory data is sorted in ascending order of the angle $\theta_y$ with respect to the Y-axis (step 102). That is, the trajectory data is sorted according to the angle $\theta_y$ with respect to the Y-axis. Let Q be the vector of each three-dimensional sputter particle trajectory projected on the YZ plane. The angle between the projected vector and the unit vector y in the Y-axis direction is calculated using formula 6 given below.

$$\theta y = \cos^{-1}\left(\frac{\vec{Q}\cdot\vec{y}}{|\vec{Q}|\cdot|\vec{y}|}\right) \qquad \text{Formula 6}$$

After calculating the angle $\theta_y$ for all trajectories, the vectors are sorted in ascending order of $\theta_y$. The vectors are numbered in ascending order and stored in an array. The sorting procedure is the same as the one for sorting $\theta_x$ in which formulas 2 to 4 are used.

After that, a model of the contact hole profile is created. To do so, string data connecting the coordinates of the outline is created on the XZ plane by taking the cross section of the contact hole along the center line (step 103). That is, a model is created by taking the cross section of the contact hole along the XZ plane. String data connecting the coordinates of the outline shown in FIG. 7, obtained as the cross section taken along the contact hole center line, is created to make a model of the contact hole profile.

Then, one of the coordinates is selected from those constituting the profile shown in FIG. 7 for use in film growth calculation (step 104).

Next, the angle, $\theta_3$, between the Y axis and the line joining the film growth profile point and the top corner of the surface profile on the YZ plane is calculated (step 105). That is, the angle between the line, joining the film growth coordinates point and the top corner of surface profile, and the Y-axis is calculated. As shown in FIG. 4, the angle $\theta_3$ is calculated on the YZ plane with the use of formula 7, shown below. In the formula, the film growth coordinates point is the start point, the vector from the start point to the top corner of the surface profile Q, and the unit vector in the Y axis direction is y.

$$\theta 3 = \cos^{-1}\left(\frac{\vec{Q}\cdot\vec{y}}{|\vec{Q}|\cdot|\vec{y}|}\right) \qquad \text{Formula 7}$$

Next, a sputter particle trajectory with $\theta_y$ in the range $\theta_3 \leq \theta_y \leq \pi-\theta_3$ (step 106) is selected from the sputter particle trajectories. That is, a sputter particle trajectory with $\theta_y$ that is equal to or larger than $\theta_3$ and equal to or smaller than $\pi-\theta_3$ is selected. To do so, from the sputter particle trajectory data which has been sorted according to the angle with the YZ plane, a particle trajectory with $\theta_y$ in the range of $\theta_3$ to $\pi-\theta_3$ is selected through a binary sort as shown in FIG. 6. More specifically, with the same procedure for sorting trajectory data according to $\theta_y$ using formulas 2 to 5, the position within the array, containing sputter particle trajectory's YZ-plane projection data sorted according to $\theta_y$, is identified where a sputter particle within the angle $\theta_3$ through $\pi-\theta_3$ is to be stored. Let Nmin be the number of the data item which satisfies $\theta_y \geq \theta_3$ and whose $\theta_y$ is closest to $\theta_3$. Using the same procedure, let Nmax be the number of the data item which satisfies $\theta_y \leq \pi-\theta_3$ and whose $\theta_y$ is closest to $\pi-\theta_3$. A data item whose number is Nmin<N<Nmax is selected to select a sputter particle trajectory satisfying $\theta_3 \leq \theta_y \leq \pi-\theta_3$. If the condition $\theta_y<\theta_3$ or $\theta_y>\pi-\theta_3$ occurs for all particles, a shadow occurs for all particles.

Then, one coordinates point for shadow judgment is selected, and the distance, R, between this point and the contact hole symmetrical axis is calculated (step 107). As shown in FIG. 7, one coordinates point (Xshadow, 0, Zshadow) for shadow judgment is selected and the distance, R, between this point and the contact hole symmetrical axis (0, 0, Zshadow) is calculated using formula 8 given below.

$$R^2 = Xshadow^2 \qquad \text{Formula 8}$$

After that, the two angles on the XZ plane, $\theta_1$ and $\theta_2$, are calculated. $\theta_1$ is the angle between the line, joining the growth profile point and shadow judgment profile point, and the X axis, and $\theta_2$ is the angle between the line, joining the growth profile point and the point symmetrical to the shadow judgment point with respect to the Z axis, and the X axis (step 108).

That is, the angles between the two lines and the X axis on the XZ plane are calculated: one line joins the film growth coordinates point and the shadow judgment coordinates point, and the other line joins the film growth coordinates point and the coordinates point symmetrical to the shadow judgment point with respect to the Z axis, respectively. As shown in FIG. 3, the angle of $\theta_1$ is calculated according to formula 9 given below, where A is the vector from the growth point to the shadow judgment point and X is the unit vector in the X axis direction. In addition, the angle of $\theta_2$ is calculated according to formula 10 given below, where B is the vector from the film growth coordinates point to the point symmetrical to the shadow judgment coordinates point with respect to the Z axis and X is the unit vector in the X axis direction.

$$\theta 1 = \cos^{-1}\left(\frac{\vec{A}\cdot\vec{x}}{|\vec{A}|\cdot|\vec{x}|}\right) \qquad \text{Formula 9}$$

$$\theta 2 = \cos^{-1}\left(\frac{\vec{B}\cdot\vec{x}}{|\vec{B}|\cdot|\vec{x}|}\right) \qquad \text{Formula 10}$$

Next, a sputter particle trajectory with $\theta_1 \leq \theta_x \leq \theta_2$ is selected (step 109). As shown in FIG. 5, from the sputter particle trajectory data which has been sorted according to the angle with respect to the XZ plane, a particle with $\theta_x$ which is equal to or larger than $\theta_1$ and equal to or smaller than $\theta_2$ is selected. That is, with the same procedure for selecting sputter particle trajectories with $\theta_3 \leq \theta_y \leq \pi - \theta_3$, sputter particle trajectories with $\theta_1 \leq \theta_x \leq \theta_2$ are selected.

Next, one of the selected sputter particles is directed toward the coordinates point for film growth calculation (step 110).

Then, the distance, r, from the intersection of the horizontal plane containing the shadow judgment coordinates point and the sputter particle trajectory to the symmetrical axis is calculated (step 111). That is, the distance, r, between the sputter particle trajectory on the shadow judgment plane and the symmetrical axis is calculated. More specifically, the intersection (Xcr, Ycr, Zcr) of the horizontal plane containing the shadow judgment profile point and the trajectory is calculated and then the square of the distance from this intersection to the contact hole symmetrical axis (0, 0, Zcr) is calculated according to formula 11 given below.

$$r^2 = Xcr^2 + Ycr^2 \qquad \text{Formula 11}$$

If r is larger than R, film growth is not calculated assuming that a shadow effect will occur (step 112). That is, if r is larger than R, a quasi-three-dimensional shadow judgment is made that particles will not be entered because of a shadow effect.

If no shadow effect is generated, that is, if r<R, the coordinates point for film growth calculation is moved into the direction of the trajectory and the film growth is calculated (step 113). That is, if no shadow effect is generated, the coordinates point for film growth is moved into the trajectory direction and the film growth is calculated.

A quasi-three-dimensional shadow judgment is made in step 110 to 113 for all selected sputter particle trajectories (step 114).

A shadow judgment is made in steps 107 to 113 for all coordinates point forming the profile (step 115).

Thus, the film growth is calculated in steps 104 to 113 for the coordinates points constituting the profile on condition that no shadow effect is generated for all selected sputter particle trajectories and for all coordinates points forming the profile used as a shadow judgment point. (step 116).

In this embodiment, a three-dimensional sputter particle trajectory s projected on the two-dimensional plane to make a shadow judgment on apparently shadowed particles in the two-dimensional plane. This decreases the number of times the three-dimensional shadow judgment must be made which will take long calculation time as the number of particles increases. For example, when sputter particles with a cosine distribution are sent to a contact hole with an aspect ratio of 2 (represented by the coordinates at a top edge opening of half the height), 16% of sputter particles which reach the bottom of the contact hole, 49% of sputter particles which reach the coordinates of the half of the height, and 100% of sputter particles which reach the coordinates on the top edge of the contact hole are selected before the quasi-three-dimensional judgment is made. Therefore, the calculation time of the three-dimensional shadow judgment which is proportional to the number of particles may be reduced to 55% ((16+49+100)/(100+100+100)×100). Thus, the calculation time of the quasi-three-dimensional judgment may be reduced to half.

Figure 8:
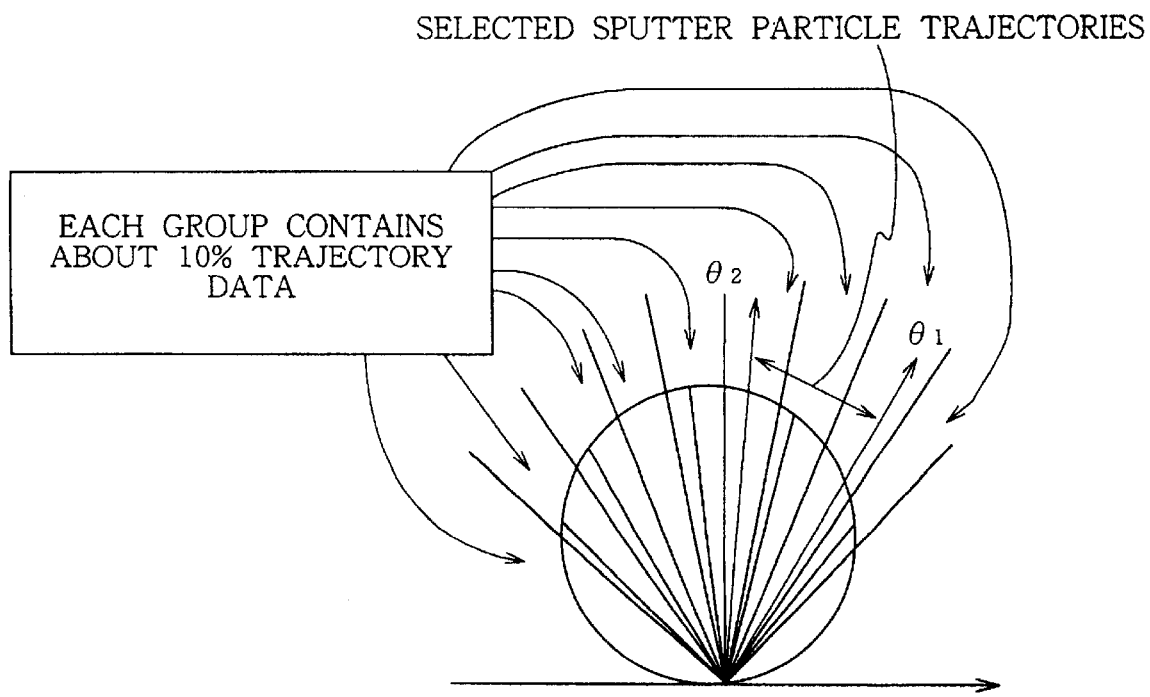
FIG. 8 is a schematic diagram of projection data of sputter particle trajectory onto a two-dimensional plane in the second embodiment.

Next, a second embodiment of the present invention will be described with reference to FIG. 8. In this embodiment, when judging sorting the sputter particle trajectories extracted by the Monte Carlo method whether they are shadowed or not, the data pieces are grouped so that each group contains 10% of all the trajectory data.

For example, in the XZ plane used to make the shadow judgment on two-dimensional data, let $\theta_1$ and $\theta_2$ be $\theta_{min}$ and $\theta_{max}$, respectively. When identifying sputter particle trajectories in the range between $\theta_{min}$ and $\theta_{max}$, the group min and the group max (including a min and $\theta_{max}$, respectively), are identified first by judging whether or not the trajectories which are at boundaries of each group are between the two lines joining film-growth calculation coordinates points to each of two shadow points. At this time, when performing a profile simulation while sequentially changing the film growth point, the group to be processed next is assumed to be the group identified during the previous film growth point shadow judgment. When the trajectory is judged to be outside the group identified during th previous shadow judgment using the trajectories at boundaries of the group, it is assumed to be in the group next to the group identified during the previous shadow judgment.

Next, binary-sort $\theta_{min}$ in the group min, and binary-sort $\theta_{max}$ in the group max, to determine the position of the $\theta_{min}$ data and $\theta_{max}$ data. After that, calculate the film growth length using the selected sputter particle trajectory data, as in the first embodiment.

The advantage of the second embodiment is the reduced calculation time. For example, binary-sorting 1000 data pieces in the first embodiment requires 10 times of judgment. On the other hand, a total of nine judgments, that is, two in group identification and seven in each group, are made in the second embodiment to identify the positions of $\theta_{min}$ and $\theta_{max}$ before data in $\theta_{min} \leq \theta \leq \theta_{max}$ is selected. Thus, the calculation time for the binary sort is reduced to 90%. If the binary sort accounts for 10% of the total calculation time, the total calculation time is reduced by 1%. This is because data is divided into ten groups each containing about 10% of the whole data. When searching for the position of θ, only the groups preceding or following the group selected immediately before are used.

As described above, three-dimensional sputter particle trajectories are projected on the two-dimensional plane to make a shadow judgment on apparently shadowed particles in the two-dimensional plane. This decreases the number of times the three-dimensional shadow judgment must be made which will take long calculation time as the number of particles increases. Thus, the calculation time for the quasi-three-dimensional shadow judgment is significantly reduced.

The invention may be embodied in other specific forms without departing from the spirit or essential characteristic thereof. The present embodiments are therefore to be considered in all respects as illustrative and not respective, the scope of the invention being indicated by the appended claims rather than by the foregoing description and all changes which come within the meaning and range of equivalency of the claims are therefore intended to be embraced therein. The entire disclosure of Japanese Patent Application No. H10-080018 (Filed on Mar. 26$^{th}$, 1998) including specification, claims, drawings and summary are incorporated herein by reference in its entirety.

What is claimed is:

1. A method of simulating, using a computer, a profile of sputter deposition on a semiconductor substrate, the method comprising the steps of:

calculating sputter trajectories of particles emitted from a sputter target;

projecting said sputter trajectories onto one or more first planes;

extracting an outline of a contact hole on a second plane parallel to one of said first planes;

defining two shadow points preventing said particles from going to a film-growth calculation coordinates point; and judging that, out of the sputter particle trajectories projected on said first plane, the sputter trajectories between two lines are film-growth contributing trajectories, said two lines joining said film-growth calculation coordinates point to each of said two shadow points.

2. The method according to claim 1, wherein said one or more first planes on which said sputter trajectories are projected are an XZ plane and a YZ plane in a XYZ coordinate system.

3. The method according to claim 2, further comprising the steps of: generating a circle in a plane parallel to an XY plane, wherein its diameter is defined by two shadow points;

calculating an intersection of the sputter trajectories determined as film-growth contributing trajectories and the plane containing said circle; and judging that the trajectories do not contribute to film growth if said intersection is outside said circle.

4. The method according to claim 1 further comprising the steps of:

sorting the sputter trajectories according to an angle of the sputter trajectory projected on said plane with one of two axes perpendicular in the plane; and selecting the film-growth contributing trajectories from the sorted trajectories.

5. The method according to claim 4, further comprising the steps of:

dividing the sorted trajectories into plural groups;

judging whether or not the trajectories at boundaries of each group are between the two lines joining said film-growth calculation coordinates point to each of said two shadow points;

extracting two groups, each having two boundaries defining a range of the group, one of said two boundaries being the trajectory between said two lines; and determining that the sputter trajectories in the groups between the extracted two groups are the sputter trajectories to be checked.

6. A method of simulating, using a computer, a profile of sputter deposition on a semiconductor substrate, the method comprising the steps of:

projecting sputter particle trajectories, calculated by a Monte Carlo method, onto an XZ plane;

sorting the sputter particle trajectories in ascending order of an angle $\theta_x$ with respect to an X axis;

projecting the sputter particle trajectories onto a YZ plane;

sorting the sputter particle trajectories in ascending order of an angle $\theta_y$ with respect to a Y axis;

on the XZ plane, creating string data connecting coordinates points of an outline obtained by taking a cross section of a contact hole along a center line;

on the YZ plane, calculating θ which is an angle between a straight line joining a growth coordinates point and a top corner of a surface profile, and the Y axis;

selecting the sputter particle trajectories with $\theta_3 \leq \theta_y \leq \pi - \theta_3$ from the sputter particle trajectories;

selecting one coordinates point for shadow judgment and calculating a distance, R, between the coordinates point and a contact hole symmetrical axis;

calculating, on the XZ plane, $\theta_1$ which is the angle between the line, joining a growth profile point and a shadow judgment profile point, and the X axis and $\theta_2$ which is the angle between the line, joining the growth profile point and the point symmetrical to the shadow judgment point with respect to the Z axis, and the X axis; and selecting the sputter particle trajectories with $\theta_1 \leq \theta x \leq \theta_2$.

7. The method according to claim 6, further comprising the steps of:

directing one of the selected sputter particles toward the coordinate point for film growth calculation;

calculating a distance, r, from an intersection of a horizontal plane containing a shadow judgment coordinate point and the sputter particle trajectory to the symmetrical axis; and if r is larger than R, calculating no film growth and, if r<R, moving the coordinate point for film growth calculation into a direction of the trajectory and calculating the film growth, R being the distance from the shadow judgment profile point to the contact hole symmetrical axis, r being the distance from the intersection of the shadow judgment plane and the sputter particle trajectory to the symmetrical axis.

8. A computer program product stored on a storage medium for simulating sputter profiles with a computer, wherein the computer comprises a processor and the storage medium storing the program, said program causing said computer to:

calculate sputter trajectories of particles emitted from a sputter target; project said sputter trajectories onto one or more first planes;

extract an outline of a contact hole on a second plane parallel to one of said first planes;

define two shadow points preventing said particles from going to a film-growth calculation coordinates point; and judge that, out of the sputter particle trajectories projected on said first plane, the sputter trajectories between two lines are film-growth contributing trajectories, said two lines joining said film-growth calculation coordinates point to each of said two shadow points.

9. The computer program product according to claim 8, wherein said one or more first planes on which said sputter trajectories are projected are an XZ plane and a YZ plane in a XYZ coordinate system.

10. The computer program product according to claim 9, wherein said computer program further causes said computer to:

generate a circle in a plane parallel to the XY plane, wherein its diameter is defined by two shadow points, calculate an intersection of the sputter trajectories determined as film-growth contributing trajectories and the plane containing said circle; and judge that the trajectories do not contribute to film growth if said intersection is outside said circle.

11. The computer program product according to claim 8, wherein said computer program further causes said computer to:

sort the sputter trajectories according to an angle of the sputter trajectory projected on said plane with one of two axes perpendicular in the plane; and select the film-growth contributing trajectories from the sorted trajectories.

\* \* \* \* \*

UNITED STATES PATENT AND TRADEMARK OFFICE
CERTIFICATE OF CORRECTION

PATENT NO.    : 6,512,998 B1
DATED         : January 28, 2003
INVENTOR(S)   : Yamada It is certified that error appears in the above-identified patent and that said Letters Patent is hereby corrected as shown below:

<u>Column 7,</u>
Line 3, "arc" should be -- are --.

Signed and Sealed this

Thirteenth Day of July, 2004

JON W. DUDAS
*Acting Director of the United States Patent and Trademark Office*